Patented Jan. 6, 1942

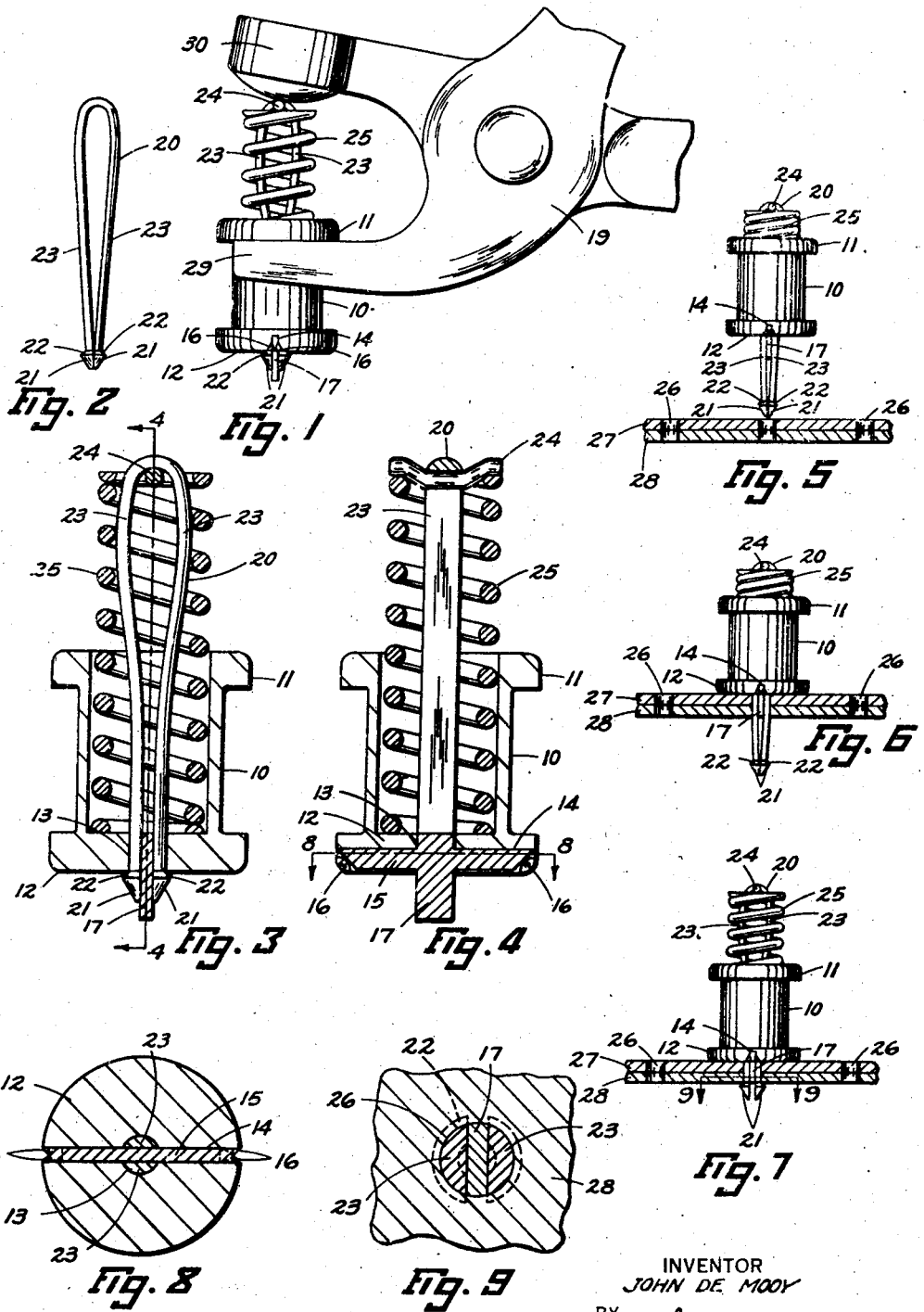

2,269,188

UNITED STATES PATENT OFFICE 2,269,188

FASTENER

John De Mooy, Shaker Heights, Ohio, assignor to The Cleveland Pneumatic Tool Company, Cleveland, Ohio, a corporation of Ohio Application March 15, 1940, Serial No. 324,158

11 Claims. (Cl. 85—5)

This invention relates to a fastener for temporarily holding together perforated plates or sheets in perforated alignment preparatory to the riveting thereof.

One object of this invention is to produce a fastener or temporary rivet which may be readily applied to and removed from the work, the temporary rivet being constructed in a manner forming a simple assembly which is strong, durable and efficient.

Another object of this invention is to produce a fastener capable of securing perforated metal sheets together in perfect perforate alignment.

Other objects and advantages more or less ancillary to the foregoing reside in the specific construction and aggroupment of the elements peculiar to this structure, as will become apparent from a more complete examination of this specification.

In the drawing which illustrates the invention:

Fig. 1 is a side elevational view of the improved fastener together with a portion of a plierlike tool with which the fastener is applied to or removed from the work. In this view, the fastener is shown in the fully retracted position.

Fig. 2 is a side elevational view of one of the parts of the fastener shown in Fig. 1.

Fig. 3 is an enlarged elevational sectional view of the fastener in the position shown in Fig. 1, but with the portion of the plierlike tool omitted.

Fig. 4 is a longitudinal sectional view taken in a plane illustrated by line 4—4 in Fig. 3.

Fig. 5 is a reduced side elevational view of the fastener shown in the position assumed during the first step of its application to the work.

Fig. 6 is a view similar to Fig. 5 illustrating the position assumed by the fastener during the second step of its application to the work.

Fig. 7 is a view similar to Fig. 5 illustrating the fastener in operative position.

Fig. 8 is a cross sectional view taken in a plane indicated by line 8—8 in Fig. 4.

Fig. 9 is a cross sectional view taken in a plane indicated by line 9—9 in Fig. 7.

Referring to the drawing in which like symbols designate corresponding parts throughout the several views, 10 represents a cup-shaped housing formed at its upper end with an external annular flange 11, and having its lower end formed by a cross wall or base 12 having a cylindrical bore 13 extending centrally therethrough. The base 12 is provided with a laterally extending groove 14 passing through the center of the bore 13, within which groove is mounted a relatively thin spreader or vertical partition 15 which is secured therein by any suitable means such as by partly closing the outer ends of the groove 14 as at 16. The spreader 15 has a longitudinally extending central or tail portion 17 extending beyond the lower end of the base 12 of the housing 10, and capable of insertion into aligned perforations of the sheets.

Slidably mounted within the housing 10, there is a retainer 20 which is formed of a piece of wire bent substantially as a hairpin with the free ends thereof each provided with a pointed head 21 and forming an outwardly inclined lateral projection 22 engageable with the underside of the work as will be hereinafter explained. Each leg 23 of the retainer 20 extends through the bore 13 one on each side of the spreader or vertical partition 15 with the tail portion 17 thereof located between the legs 23 of the retainer 20. In practice the retainer 20 is preferably made of spring wire initially formed as shown in Fig. 2, that is, with the heads 21 of the free ends thereof normally engaging each other and consequently urged toward each other in a springlike manner. Extending transversely through the upper closed end of the retainer 20 and engaging the inner flat surface thereof, there is a relatively narrow spring seat 24 against which rests one end of a compression spring 25 surrounding the retainer 20 and having its other end resting on the bottom of the cup-shaped housing 10 as clearly shown in Figs. 3 and 4.

When the sheet retainer is to be used in connection with relatively small perforations, such as the perforations 26 extending through the upper and lower plates 27 and 28 respectively, the thickness of the legs 23 of the retainer 20 are made substantially equal to that of the spreader 15. In other words, if for instance, the fastener is to be used in perforations of 3/16 of an inch in diameter, the thickness of the legs 23 of the retainer 20 as well as that of the spreader 15 will be 1/16 of an inch each, thereby affording the most available strength of the three elements for a given size of perforations.

In the operation of the device, the compression spring 25 active between the closed end of the retainer 20 and the bottom wall of the cup-shaped housing 10 will urge the retainer upwardly relative to the housing 10, causing the lateral projections 22 of the heads 21 to normally engage the base 12 of the housing 10 as shown in Fig. 3. In this instance, it will be understood that inward lateral movement of the heads 21 is prevented by the spreader 15 located between them.

The temporary rivet or fastener is applied to or removed from the work by using a plierlike tool 19 having a jaw 29 engaging the underside of the annular flange 11 of the housing 10, and another jaw 30 engaging the extreme upper end of the retainer 20. Upon movement of the two jaws toward each other, the retainer 20 will be forced downwardly relative to the housing 10 by compressing the spring 25 and causing the longitudinal movement of the heads 22 away from the base 12 of the housing 10, that is, causing the retainer 20 to be positioned relative to the housing 10 as shown in Fig. 5. In this instance, the heads 21 of the retainer 20 being now longitudinally spaced from the tail portion 17 of the spreader 15 will be allowed to move toward each other by the inherent spring characteristics of the retainer 20. In practice, the combined thickness or diameter of the heads 21 when in closed position as shown in Figs. 2 and 5, is calculated to be equal or slightly smaller than that of the perforations 26, thereby enabling insertion of the heads 21 through aligned perforations 26 of the plates 27 and 28 until the base 12 of the housing 10, which base forms a projection extending transversally of the retainer, engages the upper plate 27 as shown in Fig. 6. Thereafter if the pressure exerted on the annular flange 11 and the closed end of the retainer 20 through the jaws 29 and 30 of the plier-like tool 19 is removed, the retainer 20 due to the action of the compression spring 25 will again be urged upwardly relative to the housing 10, causing the heads 21 of the retainer 20 to be spread or moved laterally away from each other by the spreader tail portion 17 located therebetween, and consequently causing the lateral projection 22 thereof to engage the underside of the lower plate 28 for clamping the work between the heads 21 of the retainer 20 and the base 12 of the housing 10, it being understood that the compression spring 25 is sufficiently strong to hold the plates 27 and 28 against relative movement. In this clamping position it will be understood that since the lateral projections 22 are outwardly inclined, the heads 21 will only engage the lower edge of the perforations of the lower sheet thereby preventing marring or otherwise damaging the lower surface of the lower sheet. As shown in Fig. 7, it will be seen that the tail portion 17 of the spreader 15 extends substantially to the heads 21 of the retainer 20, thereby preventing any inward lateral force to which the legs 23 of the retainer might be subjected, from causing the movement of the heads toward each other or the possible bending of the legs 23 adjacent the heads 21. Since the combined thickness of the legs 23 and spreader 15 is equal to the diameter of the perforation 26, it will also be understood that the plates 27 and 28 while being held tightly in superposed relation, will also be maintained in perfect perforated alignment.

When it is desired to remove the fastener from the work, pressure through the plierlike tool 19 may again be exerted on the fastener to compress the spring 25 as shown in Fig. 6, in which instance, the heads 21 of the retainer 20 will again spring toward each other to enable removal of the fastener from the work, which removal, when the retainer is not maintained perfectly coaxial with the perforations 26, is facilitated by the outwardly inclined projections 22 of the heads 21 simply sliding off the lower edge of the lower perforation 26.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A fastener for temporarily holding together at least two perforated sheets in superposed relation, including a cupshaped housing having a base adapted to rest on the upper sheet, a bore extending centrally through said base of a diameter substantially equal to that of the perforations of the sheets, a relatively thin vertical partition central in said bore, a hairpinlike retainer slidable in said housing with the free ends thereof extending through said bore one on each side of said partition, a head on each of said free ends normally resting laterally against each other by virtue of the spring tension of said retainer, said heads when in said last position having a combined diameter enabling their insertion through aligned perforations of said sheets, and a spring urging said retainer upwardly relative to said housing for effecting the spreading of said heads by said partition and the consequential engagement of said heads with the under side of the lower sheet, said spring being of a sufficient force to hold together said sheets between said heads and the base of said housing.

2. A temporary rivet including a hairpinlike retainer, an outwardly inclined lateral projection fixed on each leg of said retainer adjacent the free end thereof, a projecting member extending transversally of said retainer and slidable with respect thereto at least up to said projections, a partition carried by said member extending laterally between the two legs of said retainer, the free ends of said legs laterally engaging each other when longitudinally spaced from said partition and laterally moved away from each other upon the slidable movement of said partition toward said projections, and spring means for constantly urging said member and partition toward the projections' carrying ends of said legs.

3. A fastener for temporarily holding together at least two perforated sheets in superposed relation, including a housing having a base adapted to rest on the upper sheet, a vertical bore through said base, a one-piece retainer slidable in said housing including two laterally resilient legs extending through said bore, an outwardly inclined lateral projection on each of said legs below said base, said projections being normally urged laterally toward each other by virtue of the spring tension of said legs, and means responsive to the slidable movement of said retainer in one direction for effecting lateral movement of said projections away from each other.

4. A temporary rivet including an elongated retaining member formed with an open end slot extending longitudinally from one end thereof, lateral projections on said member one on each side of said slot, a projecting element extending transversally of said member and slidable with respect thereto at least up to said projections, means responsive to the slidable movement of said member relative to said element in one direction for effecting lateral movement of said projections away from each other, and spring means integral with said member effecting lateral movement of said projections toward each other during the slidable movement of said member relative to said element in the other direction.

5. A temporary rivet including a retaining pin formed with a bifurcated end, an outwardly inclined lateral projection on said pin near the bifurcated end thereof, a projecting member extending transversally of said pin and slidable with respect thereto at least up to said projection, the bifurcated end of said pin forming two resilient branches normally urged toward each other by virtue of the spring tension thereof, and means responsive to the slidable movement of said retaining pin relative to said member in one direction for effecting lateral separation of said branches.

6. A fastener for temporarily holding together at least two perforated sheets in superposed relation, including a housing having a base adapted to rest on the upper sheet, a vertical bore through said base, a retainer slidable in said housing including two legs extending through said bore, an outwardly inclined lateral projection on each of said legs below said base, said projections being laterally movable toward each other for insertion through aligned perforations of said sheets and laterally movable away from each other for engagement with the under side of the lower sheet, and a rigid spreading member between said legs active thereon during the slidable movement of said retainer in one direction for effecting lateral movement of said projections away from each other.

7. A fastener for temporarily holding together at least two perforated sheets in superposed relation, including a housing having a base adapted to rest on the upper sheet, a vertical bore through said base, a retaining member including two legs slidable through said bore, an outwardly inclined lateral projection on each of said legs below said base, said projections being laterally movable toward each other for insertion through aligned perforations of said sheets and laterally movable away from each other for engagement with the under side of the lower sheet, means for laterally moving said projections toward each other during the slidable movement of said legs in one direction, and a rigid spreading member between said legs active thereon during the slidable movement of said legs in the other direction for effecting lateral movement of said projections away from each other.

8. A temporary rivet including a hairpinlike retainer, a lateral projection on each free end of said retainer normally resting laterally against each other by virtue of the spring tension of said retainer, a projecting member extending transversally of said retainer and slidable with respect thereto at least up to said projections, and means responsive to the slidable movement of said retainer relative to said member in one direction for effecting lateral separation of said projections.

9. A fastener for temporarily holding together at least two perforated sheets in superposed relation, including a housing having a base adapted to rest on the upper sheet, a vertical bore through said base, a hairpinlike retainer having its two legs slidable through said bore, a lateral projection on each of said legs below said base, said projections being laterally movable toward each other for insertion through aligned perforations of said sheets and laterally movable away from each other for engagement with the under side of the lower sheet, a rigid spreading member between said legs active thereon during the slidable movement of said retainer in one direction for effecting lateral movement of said projection away from each other, and a spring between said base and the closed end of said retainer for effecting the slidable movement of the retainer in said one direction.

10. A fastener for temporarily holding together at least two perforated sheets in superposed relation, including a housing having a base adapted to rest on the upper sheet, a vertical bore through said base, a retaining pin slidable in said housing including two laterally resilient legs extending through said bore, an outwardly inclined lateral projection on each of said legs below said base, said projections being capable of movement toward each other by virtue of the resiliency of said legs, and means carried by said housing extending between said legs and positionable therebetween at least near to said projections for preventing said movement toward each other.

11. A temporary rivet including a retaining pin formed with a bifurcated end, an outwardly inclined lateral projection on said pin near the bifurcated end thereof, a projecting member extending transversally of said pin and slidable with respect thereto at least up to said projection, the bifurcated end of said pin forming two laterally spaced resilient branches capable of movement toward each other, and means between said branches slidable with said projecting member toward said projection for preventing movement of said branches toward each other.

JOHN DE MOOY.